US008339933B2

(12) United States Patent
Choi et al.

(10) Patent No.: US 8,339,933 B2
(45) Date of Patent: Dec. 25, 2012

(54) METHOD FOR TRANSMITTING UPLINK PILOT SIGNAL IN WIRELESS COMMUNICATION SYSTEM AND APPARATUS THEREFOR

(75) Inventors: Jin-Soo Choi, Anyang-Si (KR); Han-Gyu Cho, Anyang-Si (KR); Jin-Sam Kwak, Anyang-Si (KR); Min-Seok Noh, Anyang-Si (KR); Sung-Ho Moon, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 12/751,645

(22) Filed: Mar. 31, 2010

(65) Prior Publication Data

US 2010/0254343 A1 Oct. 7, 2010

Related U.S. Application Data

(60) Provisional application No. 61/165,518, filed on Apr. 1, 2009, provisional application No. 61/166,232, filed on Apr. 2, 2009.

(30) Foreign Application Priority Data

Mar. 11, 2010 (KR) ........................ 10-2010-0021954

(51) Int. Cl.
*H04J 11/00* (2006.01)
*H04W 4/00* (2009.01)

(52) U.S. Cl. ......................... 370/208; 370/328; 375/267

(58) Field of Classification Search ........................ None
See application file for complete search history.

(56) References Cited

U.S. PATENT DOCUMENTS

| | | | | |
|---|---|---|---|---|
| 8,126,066 | B2 * | 2/2012 | Osseiran et al. | 375/260 |
| 2007/0097981 | A1 | 5/2007 | Papasakellariou | |
| 2008/0123589 | A1 | 5/2008 | Lee et al. | |
| 2008/0253469 | A1 * | 10/2008 | Ma et al. | 375/260 |
| 2008/0279294 | A1 | 11/2008 | Yang et al. | |
| 2009/0238131 | A1 * | 9/2009 | Montojo et al. | 370/329 |
| 2010/0040154 | A1 * | 2/2010 | Carbonelli et al. | 375/260 |
| 2010/0135242 | A1 * | 6/2010 | Nam et al. | 370/330 |
| 2010/0278221 | A1 * | 11/2010 | Qi et al. | 375/219 |

* cited by examiner

*Primary Examiner* — Ian N Moore
*Assistant Examiner* — Wen Suter
(74) *Attorney, Agent, or Firm* — Birch, Stewart, Kolasch & Birch, LLP

(57) ABSTRACT

A method for transmitting an uplink pilot signal in a wireless communication system is disclosed. The method for transmitting an uplink pilot signal in a wireless communication system includes forming a basic unit including a plurality of pilot Resource Elements (REs) and data REs and having a size of 4 subcarriers×9 Orthogonal Frequency Division Multiple Access (OFDMA) symbols, setting the plurality of pilot REs in the basic unit, and transmitting the basic unit to a base station. Each of the REs is time-frequency resource defined by one symbol index and one subcarrier index.

6 Claims, 13 Drawing Sheets

P1 : pilot RE for antenna port #0

P1 : pilot RE for antenna port #0

P2 : pilot RE for antenna port #1

P1 : pilot RE for antenna port #0

P1 : pilot RE for antenna port #0

P1 : pilot RE for antenna port #0

P1 : pilot RE for antenna port #0

P1 : pilot RE for antenna port #0

P1 : pilot RE for antenna port #0

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

P1 : pilot RE for antenna port #0

P2 : pilot RE for antenna port #1

METHOD FOR TRANSMITTING UPLINK PILOT SIGNAL IN WIRELESS COMMUNICATION SYSTEM AND APPARATUS THEREFOR

This application claims the benefit of U.S. Provisional Patent Applications Nos. 61/165,518, filed on Apr. 1, 2009, 61/166,232, filed on Apr. 2, 2009, and Korean Patent Application No. 10-2010-0021954, filed on Mar. 11, 2010, which are hereby incorporated by reference as if fully set forth herein.

BACKGROUND OF THE INVENTION

1. Field of the Invention

The present invention relates to a wireless communication system, and more particularly, to a method for transmitting an uplink pilot signal in a wireless communication system and an apparatus therefor.

2. Discussion of the Related Art

FIG. 1 shows a wireless communication system. Referring to FIG. 1, the wireless communication system 100 includes a plurality of base stations 110 and a plurality of terminals 120. The wireless communication system 100 may include a homogeneous network or a heterogeneous network. The heterogeneous network refers to a network in which different network entities such as a macro cell, a femto cell, a pico cell and a repeater coexist. The base station is generally a fixed station communicating with a terminal, and base stations 110*a*, 110*b* and 110*c* provide services to specific geographical areas 102*a*, 102*b* and 102*c*. In order to improve system performance, a specific area may be divided into smaller areas 104*a*, 104*b* and 104*c*. Each of the smaller areas may be referred to as a cell, a sector or a segment. In an IEEE 802.16 system, a cell identity (Cell_ID or IDCell) is given based on the overall system. In contrast, a sector or segment identity is given based on a specific area, to which each base station provides a service, and has values of 0 to 2. The terminal 120 is generally distributed in the wireless communication system and may be fixed or moved. Each terminal may communicate with one or more base stations through an uplink (UL) and a downlink (DL) at a certain instant. The base station and the terminal may perform communication using Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA) or a combination thereof. In the present specification, the term “uplink” refers to a communication link from a terminal to a base station and the term “downlink” refers to a communication link from a base station to a terminal.

SUMMARY OF THE INVENTION

An object of the present invention devised to solve the problem lies on a method for transmitting an uplink pilot signal in a wireless communication system, and an apparatus therefor.

The object of the present invention can be achieved by providing a method for transmitting an uplink pilot signal in a wireless communication system, the method including: forming a basic unit including a plurality of pilot Resource Elements (REs) and data REs and having a size of 4 subcarriers (subcarrier indexes of 0 to 3)×9 Orthogonal Frequency Division Multiple Access (OFDMA) symbols (symbol indexes of 0 to 8); setting the plurality of pilot REs in the basic unit; and transmitting the basic unit to a base station, wherein each of the REs is time-frequency resource defined by one symbol index and one subcarrier index.

The setting of the pilot REs may includes arranging three pilot REs at the subcarrier indexes of 0 and 3 on a frequency axis, and arranging the three pilot REs arranged on the frequency axis on a time axis at an interval of two or more symbol indexes.

In this case, the setting of the pilot REs may include arranging the plurality of pilot REs at different symbol indexes on the time axis.

The transmitting of the basic unit to the base station may include boosting power of the pilot REs using power of the data REs within the same OFDMA symbol.

In another aspect of the present invention, provided herein is method for transmitting an uplink pilot signal in a wireless communication system, the method including: forming a basic unit including a plurality of pilot Resource Elements (REs) and data REs for a first antenna port and a second antenna port and having a size of 4 subcarriers (subcarrier indexes of 0 to 3)×9 Orthogonal Frequency Division Multiple Access (OFDMA) symbols (symbol indexes of 0 to 8); setting the plurality of pilot REs for the first antenna port and the second antenna port in the basic unit; and transmitting the basic unit to a base station, wherein each of the REs is time-frequency resource defined by one symbol index and one subcarrier index.

The setting of the pilot REs may include arranging two pilot REs out of three pilot REs for the first antenna port at a subcarrier index of 0 and symbol indexes of 0 and 8, and arranging the remaining one pilot RE out of the three pilot REs for the first antenna port at a subcarrier index of 3 and any one of symbol indexes of 2 to 6.

The setting of the pilot REs may include arranging two pilot REs out of three pilot REs for the second antenna port at a subcarrier index of 3 and symbol indexes of 0 and 8, and arranging the remaining one pilot RE out of the three pilot REs for the second antenna port at a subcarrier index of 0 and any one of symbol indexes of 2 to 6.

The transmitting of the basic unit to the base station may include boosting power of the pilot REs using power of the data REs within the same OFDMA symbol.

The basic unit may be an uplink Partial Usage of Subchannel (PUSC). A transmit diversity scheme may be applied to the transmission of the basic unit. The transmit diversity scheme may be a Space Frequency Block Code (SFBC) scheme.

According to the embodiments of the present invention, in the wireless communication system, a terminal can efficiently transmit an uplink pilot signal and a base station can perform efficient channel estimation using the uplink pilot signal.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

The configuration, operation and other features of the present invention will be more readily apparent from consideration of the following detailed description relating to the accompanying drawings. In the following embodiments, the technical features of the present invention are applied to a system using a plurality of orthogonal subcarriers. Although, for convenience, the present invention is described using an IEEE 802.16 system, the present invention is applicable to various wireless communication systems including a 3rd Generation Partnership Project (3GPP) system.

Figure 1:
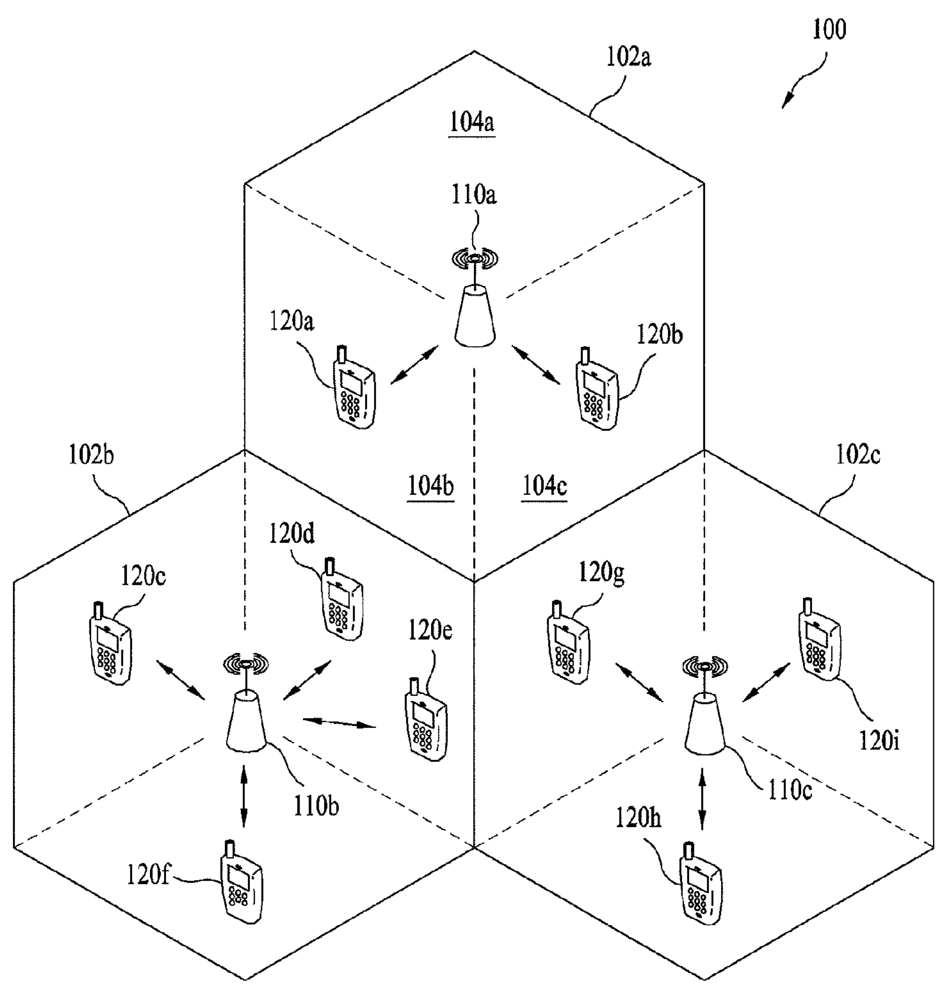
FIG. 1 is a diagram showing a wireless communication system.
Figure 2:
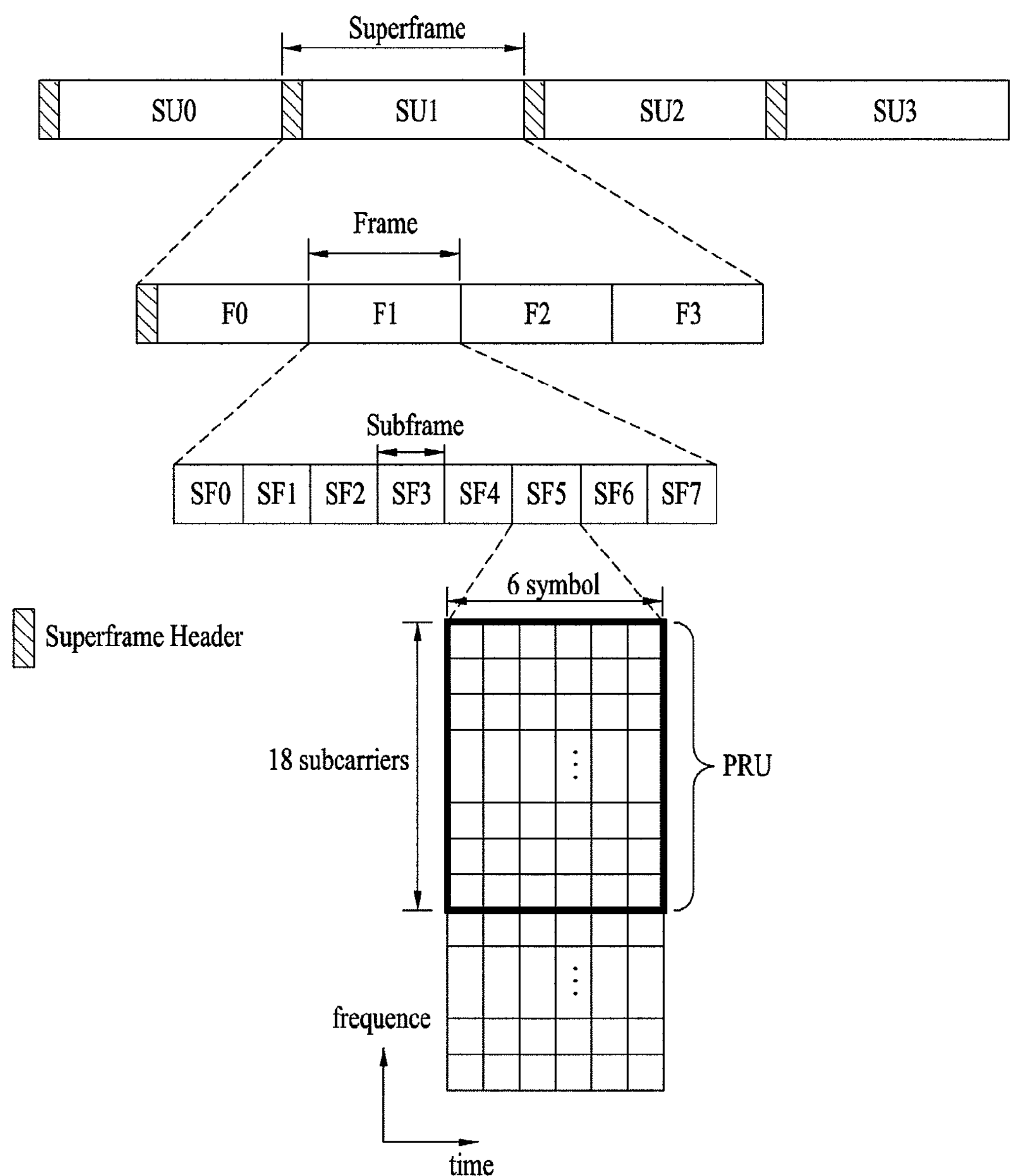
FIG. 2 is a diagram showing a radio frame structure of a conventional IEEE 802.16e system.

FIG. 2 is a diagram showing a radio frame structure of a conventional IEEE 802.16e system.

Referring to FIG. 2, the radio frame structure includes 20-ms super frames SU0 to SU3 with a bandwidth of 5 MHz, 8.75 MHz, 10 MHz or 20 MHz. Each superframe includes four 5-ms frames F0 to F3 having the same size and starts at a Super Frame Header (SFH). The SFH carries essential system parameter and system configuration information.

The frame includes eight subframes SF0 to SF7. Each subframe is allocated to a downlink or uplink transmission. The subframe includes a plurality of Orthogonal Frequency Division Multiplexing (OFDM) symbols in a time domain and includes a plurality of subcarriers in a frequency domain. The OFDM symbol may be called an OFDMA symbol or a SC-FDMA symbol according to a multiple access scheme. The number of OFDM symbols included in the subframe may be variously changed according to a channel bandwidth or the length of a Cyclic Prefix (CP).

The type of the subframe may be defined according to the number of OFDM symbols included in the subframe. For example, a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include the same type of subframes or different types of subframes.

More particularly, the type-4 subframe including 9 OFDM symbols applies only to an uplink subframe in the case of supporting a WirelessMAN-OFDMA frame with a channel bandwidth of 8.75 MHz.

Figure 3:
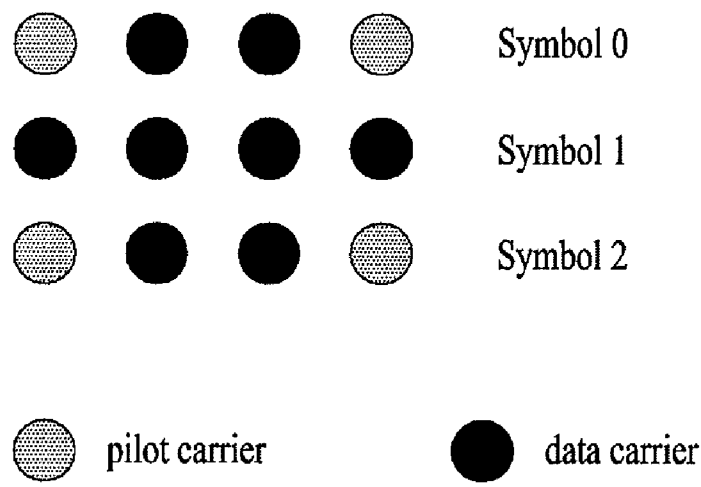
FIG. 3 is a diagram showing a tile and pilot structure of a conventional IEEE 802.16e system.

FIG. 3 is a diagram showing a tile and pilot structure of a conventional IEEE 802.16e system.

In a current IEEE 802.16e system, the tile and pilot structure shown in FIG. 3 is included as an uplink Partial Usage of SubChannel (PUSC). In particular, FIG. 3 shows the case where one transmission antenna is considered. Such an uplink PUSC basic unit structure has pilot overhead of 33.33%. In FIG. 3, pilot and data carriers refer to Resource Elements (REs) to which pilot and data are respectively allocated. Each RE indicates time-frequency resources defined by one OFDM(A) symbol and one subcarrier. In the present specification, a "pilot (sub)carrier" and a "data (sub)carrier" may be used mixed with a "pilot RE" and a "data RE".

The uplink tile structure used in the current IEEE 802.16e system has pilot overhead of 33.33% in the case of one transmission antenna. Accordingly, pilot overhead is significantly greater than data overhead. Such pilot overhead reduces link throughput so as to cause deterioration in system performance. In particular, in the case where the basic unit expands like the IEEE 802.16m system, pilot overhead is reduced.

The embodiments of the present invention provide a basic unit for a structure, which is able to reduce pilot overhead in uplink of an OFDM(A) system and to ensure excellent performance of channel estimation, and a pilot structure. In the embodiments of the present invention, within the basic unit, pilot REs are allocated on a time axis in consideration of a coherent time, such that channel estimation robust to a low-speed and high-speed case is possible in a time domain. In addition, pilot REs are allocated on a frequency axis in consideration of a coherent bandwidth, such that channel estimation robust to a variety of delay spread is possible in a frequency domain. In addition, if basic units are consecutively allocated on the time/frequency axis, a basic unit and a pilot structure capable of improving channel estimation performance using the pilots of the consecutive basic units is provided.

Figure 4:
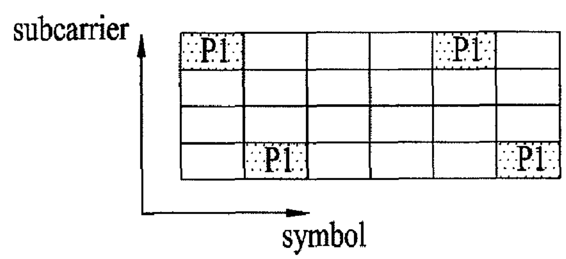
FIG. 4 is a diagram showing allocation of 1 Tx or 1 stream pilot in the case where an uplink PUSC basic unit is composed of 4 subcarriers×6 OFDM(A) symbols in a current IEEE 802.16m system.

FIG. 4 is a diagram showing allocation of 1 Tx or 1 stream pilot in the case where an uplink PUSC basic unit is composed of 4 subcarriers×6 OFDM(A) symbols in a current IEEE 802.16m system.

Referring to FIG. 4, in the 4×6 basic unit, the pilot REs are located at a subcarrier index of 0 when a symbol index is 0, a subcarrier index of 3 when a symbol index is 1, a subcarrier index of 0 when a symbol index is 4, and a subcarrier index of 3 when a symbol index is 5.

Figure 5:
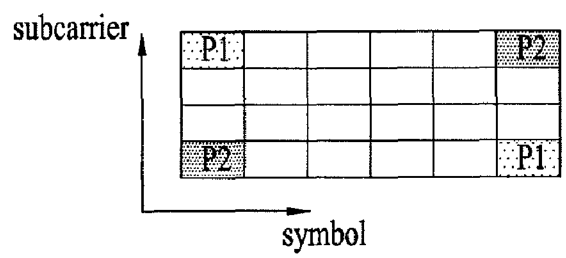
FIG. 5 is a diagram showing allocation of 2 Tx or 2 stream pilots in the case where an uplink PUSC basic unit is composed of 4 subcarriers×6 OFDM(A) symbols in a current IEEE 802.16m system.

FIG. 5 is a diagram showing allocation of 2 Tx or 2 stream pilots in the case where an uplink PUSC basic unit is composed of 4 subcarriers×6 OFDM(A) symbols in a current IEEE 802.16m system.

Referring to FIG. 5, in the 4×6 basic unit, the 2 Tx or 2 stream pilots are arranged two by two, for each antenna port. The pilot REs for an antenna port 0 are located at a subcarrier index of 0 when a symbol index is 0 and a subcarrier index of 3 when a symbol index is 5. The pilot REs for an antenna port 1 are located at a subcarrier index of 3 when a symbol index is 0 and a subcarrier index of when a symbol index is 5. The antenna ports may be switched with each other.

Hereinafter, pilot patterns optimized in a type-4 subframe composed of 4 subcarriers×9 OFDM(A) symbols in order to solve the above problems are suggested. For convenience of description, the case where 1 Tx or 1 stream pilot is allocated to a type-4 subframe and the case where 2 Tx or 2 stream pilots are allocated to a type-4 subframe will be described.

<The Case where 1 Tx or 1 Stream Pilot is Allocated>

FIGS. 6 to 11 are diagrams showing allocation of 1 Tx or 1 stream pilot in the case where a basic unit is composed of 4 subcarriers×9 OFDM(A) symbols according to an embodiment of the present invention.

Subcarriers located on edges of tiles have channel measurement performance lower than that of subcarriers located on central portions of the tiles. In particular, if a pilot pattern is used not as a common pilot but as a dedicated pilot, such performance deterioration becomes serious. In the pilot patterns shown in FIGS. 6 to 11, deterioration in channel measurement performance of the subcarriers located on the edges of the tiles due to extrapolation can be avoided.

Figure 6:
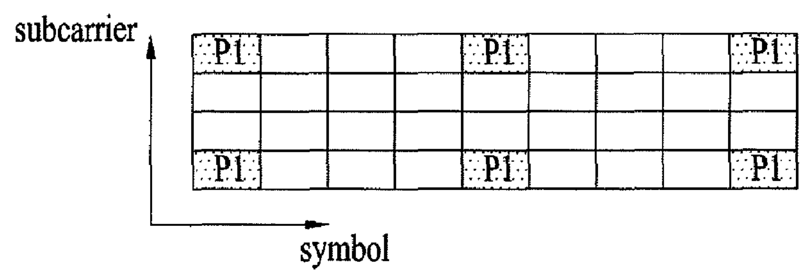
FIGS. 6 to 11 are diagrams showing allocation of 1 Tx or 1 stream pilot in the case where a basic unit is composed of 4 subcarriers×9 OFDM(A) symbols according to an embodiment of the present invention.

First, referring to FIG. 6, the pilots are located at both ends of the 4×9 basic unit on the frequency axis and are arranged at the same time interval. The 4×9 basic unit may be consecutively allocated in the frequency domain or the time domain. In detail, the pilot REs are located at subcarrier indexes of 0 and 3 when a symbol index is 0, subcarrier indexes of 0 and 3 when a symbol index is 4, and subcarrier indexes of 0 and 3 when a symbol index is 8.

Figure 7:
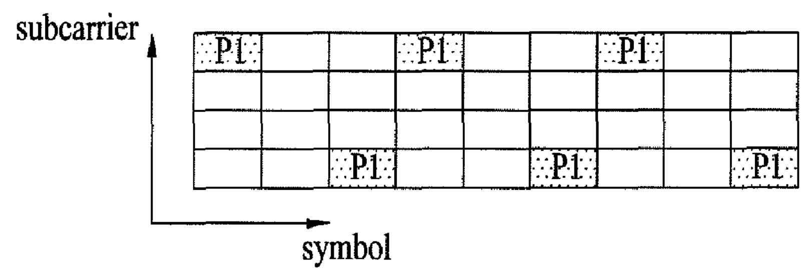

In FIG. 7, three pilot REs are located at each of subcarrier indexes of 0 and 3 on the frequency axis. Further, on the time axis, three pilot REs located at subcarriers are arranged at an interval of two or more symbol indexes. In addition, two or more pilot REs are not located at one symbol index.

Using such a method, the pilot REs are located at a subcarrier index of 0 when a symbol index is 0, a subcarrier index of 3 when a symbol index is 2, and a subcarrier index of 0 when a symbol index is 3. In addition, the pilot REs are located at a subcarrier index of 3 when a symbol index is 5, a subcarrier index of 0 when a symbol index is 6, and a subcarrier index of 3 when a symbol index is 8.

Figure 8:
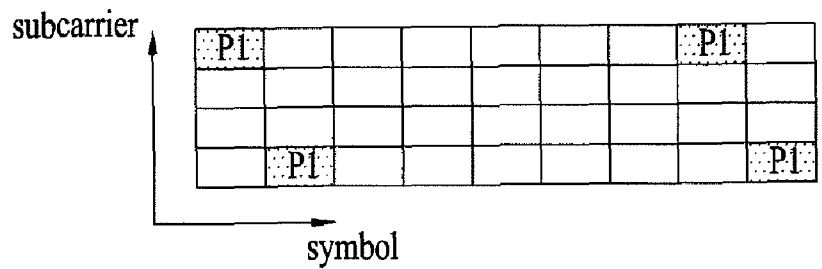

In FIG. 8, the pilot REs are located at a subcarrier index of 0 when a symbol index is 0 and a subcarrier index of 3 when a symbol index is 1. In addition, the pilot REs are located at a subcarrier index of 0 when a symbol index is 7 and a subcarrier index of 3 when a symbol index is 8.

Figure 9:
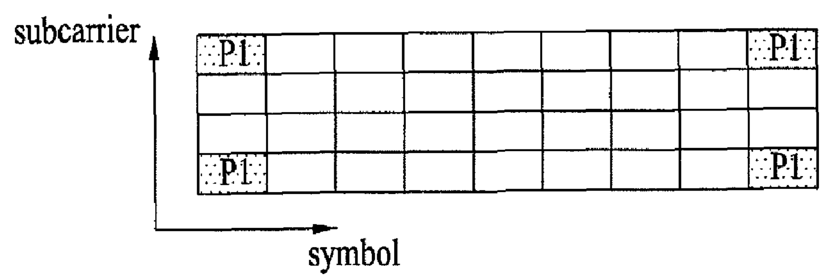

In FIG. 9, the pilot REs are located at subcarrier indexes of 0 and 3 when a symbol index is 0 and subcarrier indexes of 0 and 3 when a symbol index is 8.

Figure 10:
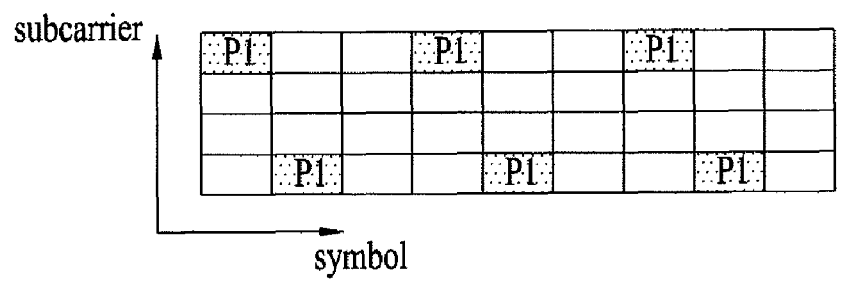

In FIG. 10, similar to FIG. 7, three pilot REs are located at each of the subcarrier indexes 0 and 3 on the frequency axis. Further, on the time axis, three pilot REs located at subcarriers are arranged at an interval of two or more symbol indexes. In addition, two or more pilot REs are not located at one symbol index.

Using such a method, the pilot REs are located at a subcarrier index of 0 when a symbol index is 0, a subcarrier index of 3 when a symbol index is 1, and a subcarrier index of 0 when a symbol index is 3. In addition, the pilot REs are a subcarrier index of 3 when a symbol index is 4, a subcarrier index of 0 when a symbol index is 6, and a subcarrier index of 3 when a symbol index is 7.

Figure 11:
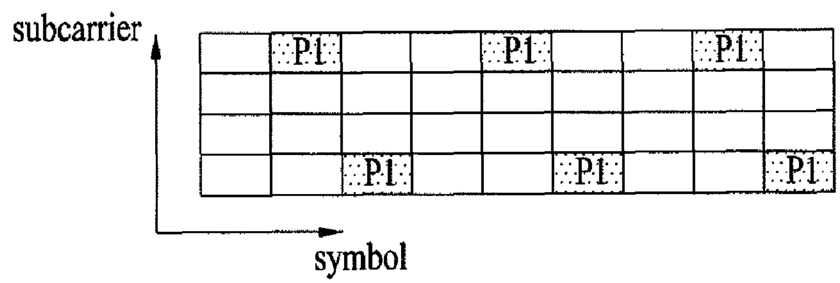

Lastly, in FIG. 11, the pilot REs are located at a subcarrier index of 0 when a symbol index is 1, a subcarrier index of 3 when a symbol index is 2, and a subcarrier index of 0 when a symbol index is 4. In addition, the pilot REs are located at a subcarrier index of 3 when a symbol index is 5, a subcarrier index of 0 when a symbol index is 7, and a subcarrier index of 3 when a symbol index is 8.

<The Case where 2 Tx or 2 Stream Pilots are Allocated>

FIGS. 12 to 20 are diagrams showing allocation of 2 Tx or 2 stream pilots in the case where a basic unit is composed of 4 subcarriers×9 OFDM(A) symbols according to an embodiment of the present invention.

If the pilot patterns shown in FIGS. 12 to 20 are used, the following advantages are obtained.

First, if a wireless communication system supports a transmit diversity scheme of a Multi-Input Multi-Output (MIMO) scheme, the pilot patterns of FIGS. 12 to 20 can efficiently support a Space Frequency Block Code (SFBC) MIMO scheme. In order to support the SFBC, the number of subcarriers for transmitting data and control information excluding pilots is an even number. In particular, when a pair of subcarriers is consecutively allocated within OFDM(A) symbols, SFBC performance can be further improved. In the SFBC, if channels experienced by a pair of subcarriers are equal or similar, large gain can be obtained. Referring to FIGS. 12 to 20, subcarriers excluding pilots are consecutively located within the OFDM(A) symbols and the number thereof is an even number. Accordingly, the pilot patterns of FIGS. 12 to 20 can efficiently support a MIMO system.

Second, the pilots for antenna ports 0 and 1 are allocated to the same OFDM(A) symbol such that channel estimation performance can be improved by pilot boosting. For example, if pilots and data for the antenna port 0 are transmitted, neither of the pilot REs for the antenna port 1 is transmitted. In this case, power allocated to the pilots for the antenna port 1 may be additionally allocated to the pilots for the antenna port 0. Accordingly, channel estimation performance can be improved by pilot boosting. In addition, a power balancing problem is solved in an uplink transmission in which available power is restricted.

Third, efficient channel estimation maximally using a coherent time and a coherent bandwidth is possible. In detail, even in an environment in which channel delay spread is large, a channel is hardly changed or linearly slightly changed in the unit of four subcarriers. In addition, if a terminal is not moved at a high speed, the channel change is not large in the unit of 9 or less OFDM(A) symbols. In addition, even when the movement speed of the terminal is increased so as to experience a high-speed channel, the channel is linearly changed in the unit of 9 or less OFDM(A) symbols. Referring to the pilot patterns of FIGS. 12 to 20, two pilots for each antenna port are located at the diagonal ends of the 4×9 basic unit. Accordingly, a coherent time and a coherent bandwidth are maximally used so as to improve channel estimation performance.

Fourth, pilots are allocated to edges of the 4×9 basic unit so as to prevent deterioration in channel estimation performance due to extrapolation upon channel estimation.

Figure 12:
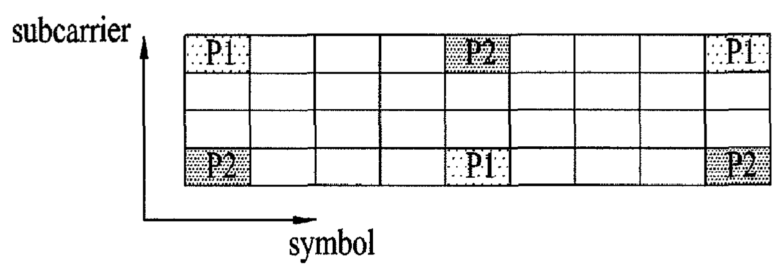
FIGS. 12 to 20 are diagrams showing allocation of 2 Tx or 2 stream pilots in the case where a basic unit is composed of 4 subcarriers×9 OFDM(A) symbols according to an embodiment of the present invention.

First, referring to FIG. 12, in the 4×9 basic unit, 2 Tx or 2 stream pilots are arranged three by three, for each antenna port. In detail, two pilot REs out of the three pilot REs for an antenna port 0 are located at symbol indexes of 0 and 8 and a subcarrier index of 0. In addition, the remaining one pilot RE for the antenna port 0 is located at a subcarrier index of 3 and any one of symbol indexes of 2 to 6. For example, the remaining one pilot RE for the antenna port 0 may be located at a symbol index of 4 and a subcarrier index of 3.

In addition, two pilot REs out of the three pilot REs for an antenna port 1 are located at symbol indexes of 0 and 8 and a subcarrier index of 3. In addition, the remaining one pilot RE for the antenna port 1 is located at a subcarrier index of 0 and any one of symbol indexes of 2 to 6. For example, the remaining one pilot RE for the antenna port 1 may be located at a symbol index of 4 and a subcarrier index of 0.

Figure 13:
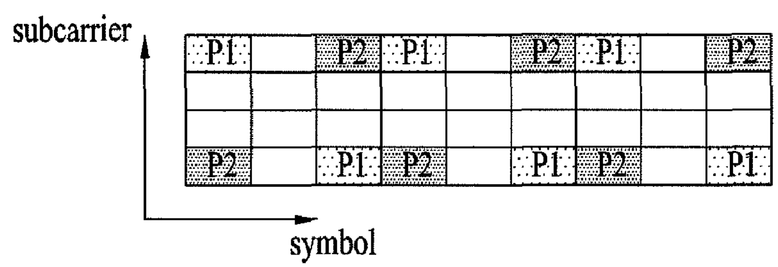

Referring to FIG. 13, the pilot REs for the antenna port 0 are located at a subcarrier index of 0 when a symbol index is 0, a subcarrier index of 3 when a symbol index is 2, and a subcarrier index of 0 when a symbol index is 3. In addition, the pilot REs for the antenna port 0 are located at a subcarrier index of 3 when a symbol index is 5, a subcarrier index of 0 when a symbol index is 6, and a subcarrier index of 3 when a symbol index is 8.

Meanwhile, the pilot REs for the antenna port 1 are located at a subcarrier index of 3 when a symbol index is 0, a subcarrier index of 0 when a symbol index is 2, and a subcarrier index of 3 when a symbol index is 3. In addition, the pilot REs for the antenna port 1 are located at a subcarrier index of 0 when a symbol index is 5, a subcarrier index of 3 when a symbol index is 6, and a subcarrier index of 0 when a symbol index is 8.

Figure 14:
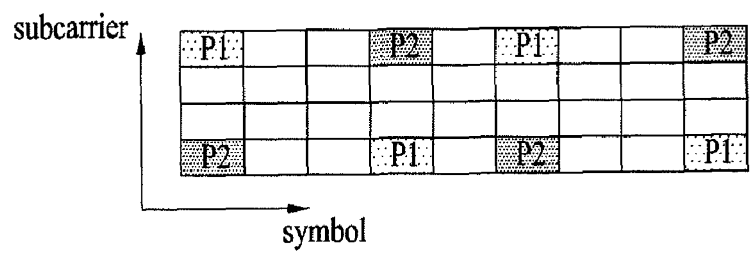

Referring to FIG. 14, the pilot REs for an antenna port 0 are located at a subcarrier index of 0 when a symbol index is 0 and a subcarrier index of 3 when a symbol index is 3. In addition, the pilot REs for an antenna port 0 are located at a subcarrier index of 0 when a symbol index is 5 and a subcarrier index of 3 when a symbol index is 8.

Meanwhile, the pilot REs for an antenna port 1 are located at a subcarrier index of 3 when a symbol index is 0 and a subcarrier index of 0 when a symbol index is 3. In addition, the pilot REs for an antenna port 1 are located at a subcarrier index of 3 when a symbol index is 5 and a subcarrier index of 0 when a symbol index is 8.

Figure 15:
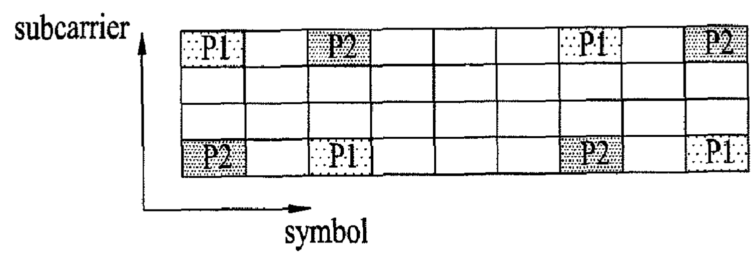

Referring to FIG. 15, the pilot REs for an antenna port 0 are located at a subcarrier index of 0 when a symbol index is 0 and a subcarrier index of 3 when a symbol index is 2. In addition, the pilot REs for an antenna port 0 are located at a subcarrier index of 0 when a symbol index is 6 and a subcarrier index of 3 when a symbol index is 8.

Meanwhile, the pilot REs for an antenna port 1 are located at a subcarrier index of 3 when a symbol index is 0 and a subcarrier index of 0 when a symbol index is 2. In addition, the pilot REs for an antenna port 1 are located at a subcarrier index of 3 when a symbol index is 6 and a subcarrier index of 0 when a symbol index is 8.

Figure 16:
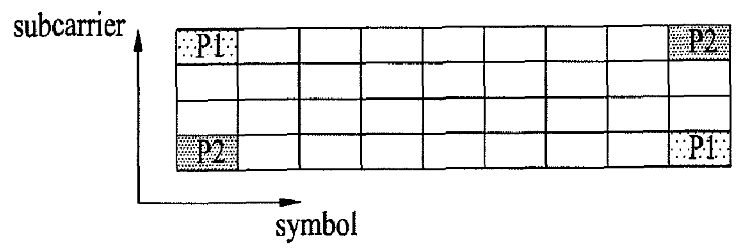

Referring to FIG. 16, the pilot REs for an antenna port 0 are located at a subcarrier index of 0 when a symbol index is 0 and a subcarrier index of 3 when a symbol index is 8. The pilot REs for an antenna port 1 are located at a subcarrier index of 3 when a symbol index is 0 and a subcarrier index of 0 when a symbol index is 8.

Figure 17:
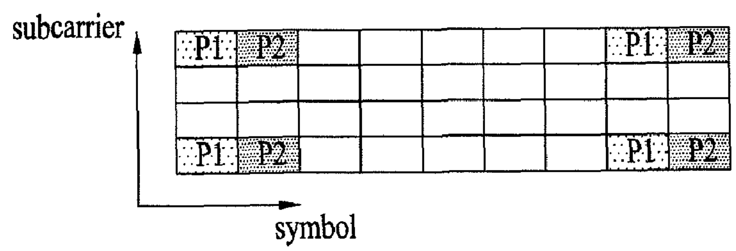

Referring to FIG. 17, the pilot REs for an antenna port 0 are located at subcarrier indexes of 0 and 3 when a symbol index is 0 and subcarrier indexes of 0 and 3 when a symbol index is 7. The pilot REs for an antenna port 1 are located at subcarrier indexes of 0 and 3 when a symbol index is 1 and subcarrier indexes of 0 and 3 when a symbol index is 8.

Figure 18:
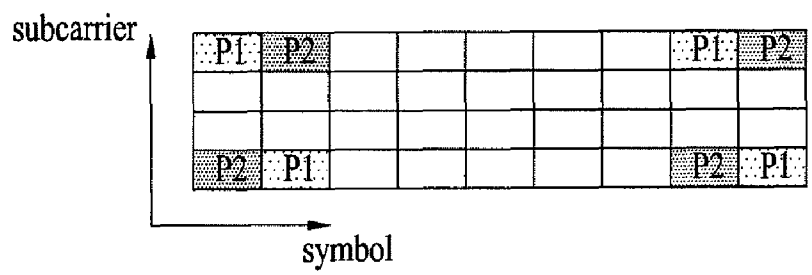

Referring to FIG. 18, the pilot REs for an antenna port 0 are located at a subcarrier index of 0 when a symbol index is 0 and a subcarrier index of 3 when a symbol index is 1. In addition, the pilot REs for an antenna port 0 are located at a subcarrier index of 0 when a symbol index is 7 and a subcarrier index of 3 when a symbol index is 8.

The pilot REs for an antenna port 1 are located at a subcarrier index of 3 when a symbol index is 0 and a subcarrier index of 0 when a symbol index is 1. In addition, the pilot REs for an antenna port 1 are located at a subcarrier index of 3 when a symbol index is 7 and a subcarrier index of 0 when a symbol index is 8.

Figure 19:
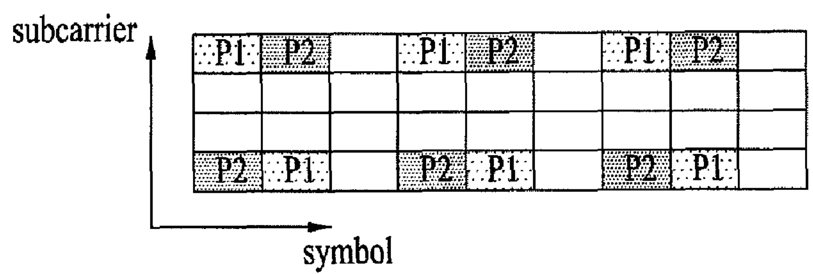

Referring to FIG. 19, the pilot REs for an antenna port 0 are located at a subcarrier index of 0 when a symbol index is 0, a subcarrier index of 3 when a symbol index is 1, and a subcarrier index of 0 when a symbol index is 3. In addition, the pilot REs for an antenna port 0 are located at a subcarrier index of 3 when a symbol index is 4, a subcarrier index of 0 when a symbol index is 6, and a subcarrier index of 3 when a symbol index is 7.

The pilot REs for an antenna port 1 are located at a subcarrier index of 3 when a symbol index is 0, a subcarrier index of 0 when a symbol index is 1, and a subcarrier index of 3 when a symbol index is 3. In addition, the pilot REs for an antenna port 1 are located at a subcarrier index of 0 when a symbol index is 4, a subcarrier index of 3 when a symbol index is 6, and a subcarrier index of 0 when a symbol index is 7.

Figure 20:
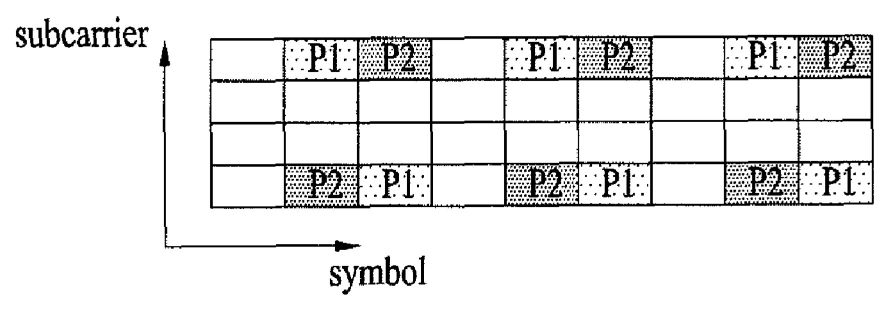

Lastly, referring to FIG. 20, the pilot REs for an antenna port 0 are located at a subcarrier index of 0 when a symbol index is 1, a subcarrier index of 3 when a symbol index is 2, and a subcarrier index of 0 when a symbol index is 4. In addition, the pilot REs for an antenna port 0 are located at a subcarrier index of 3 when a symbol index is 5, a subcarrier index of 0 when a symbol index is 7, and a subcarrier index of 3 when a symbol index is 8.

The pilot REs for an antenna port 1 are located at a subcarrier index of 3 when a symbol index is 1, a subcarrier index of 0 when a symbol index is 2, and a subcarrier index of 3 when a symbol index is 4. In addition, the pilot REs for an antenna port 1 are located at a subcarrier index of 0 when a symbol index is 5, a subcarrier index of 3 when a symbol index is 7, and a subcarrier index of 0 when a symbol index is 8.

Figure 21:
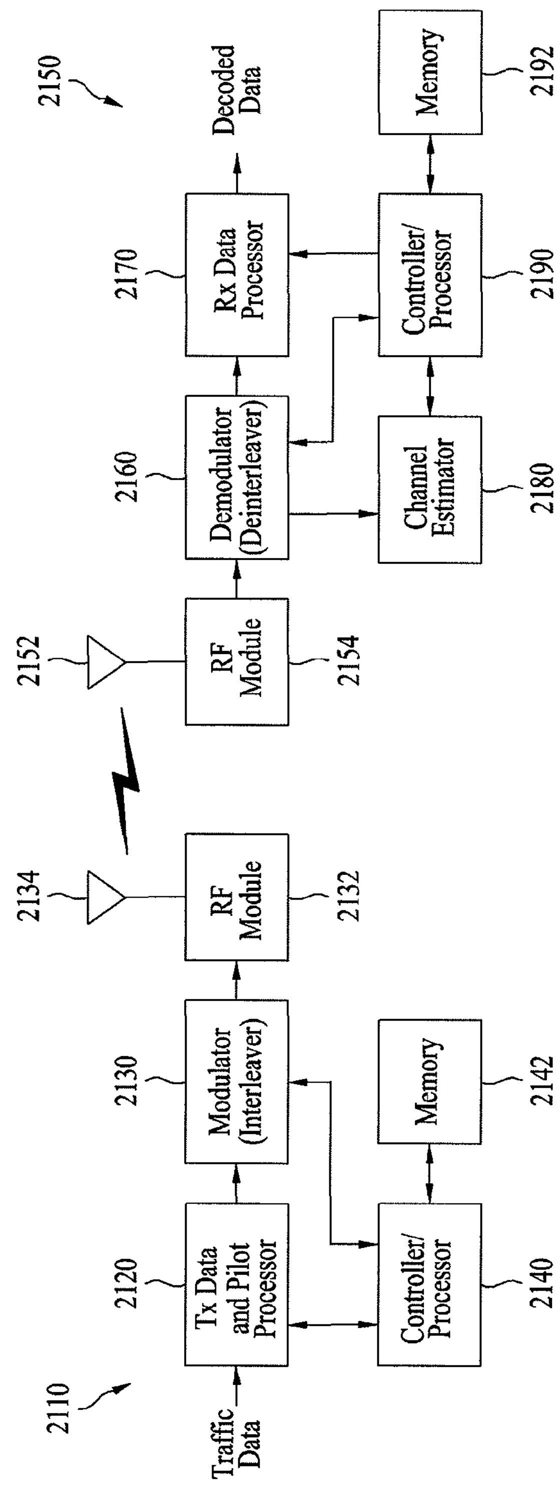
FIG. 21 is a block diagram of a transmitter and a receiver according to an embodiment of the present invention.

FIG. 21 is a block diagram of a transmitter and a receiver according to an embodiment of the present invention. In downlink, the transmitter 2110 is a portion of a base station and the receiver 2150 is a portion of a terminal. In uplink, the transmitter 2110 is a portion of a terminal and the receiver 2150 is a portion of a base station.

In the transmitter 2110, a transmission (Tx) data and pilot processor 2120 encodes, interleaves and symbol-maps data (e.g., traffic data and signaling) and generates data symbols. In addition, the processor 2120 generates pilot symbols and multiplexes data symbols and pilot symbols.

A modulator 2130 generates transport symbols according to a wireless access scheme. The wireless access scheme includes FDMA, TDMA, CDMA, SC-FDMA, MC-FDMA, OFDMA or a combination thereof. In addition, the modulator 2130 may enable data to be distributed and transmitted in a frequency domain using various permutation methods of the embodiments of the present invention. A Radio Frequency (RF) module 2132 processes (e.g., analog converts, amplifies, filters and frequency up-converts) the transport symbols and generates an RF signal transmitted through an antenna 2134.

In the receiver 2150, an antenna 2152 receives a signal transmitted from the transmitter 2110 and supplies the signal to an RF module 2154. The RF module 2154 processes (e.g., filters, amplifies, frequency down-converts, and digitizes) the received signal and supplies input samples.

A demodulator 2160 demodulates the input samples and supplies data values and pilot values. A channel estimator 2180 acquires a channel estimation value based on the received pilot values. In addition, the demodulator 2160 performs data detection (or equalization) with respect to the received data values using the channel estimation value and supplies data symbol estimation values for the transmitter 2110. In addition, the demodulator 2160 may perform operations inverse to the various permutation methods of the embodiments of the present invention and realign data dispersed in a frequency domain and a time domain in original order. A reception (Rx) data processor 2170 symbol-demaps, deinterleaves, and decodes the data symbol estimation values and supplies decoded data.

In general, the processes of the demodulator 2160 and the Rx data processor 2170 in the receiver 2150 is complementary to the processes of the modulator 2130 and the Tx data and pilot processor 2120 in the transmitter 2110.

Controllers/processors 2140 and 2190 control the operations of various processing modules of the transmitter 2110 and the receiver 2150. Memories 2142 and 2192 store program codes and data for the transmitter 2110 and the receiver 2150.

The modules shown in FIG. 21 are only shown for illustrative purpose. The transmitter and/or the receiver may further include necessary modules, some of the modules/functions may be omitted or separated into different modules, or two or more modules may be integrated into one module.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be rearranged. Some components or characteristics of any embodiment may also be included in other embodiments, or may be replaced with those of the other embodiments as necessary. In addition, the embodiments may be constructed by combining claims having no explicit citation relations or new claims may also be added by amendment after patent application.

The embodiments of the present invention are disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station" may be replaced with a fixed station, Node-B, eNode-B (eNB), or an access point as necessary. The term "terminal" may also be replaced with user equipment (UE), mobile station (MS), mobile subscriber station (MSS) or mobile terminal as necessary.

The embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The present invention is applicable to a wireless communication system. More particularly, the present invention is applicable to a wireless mobile communication apparatus used for a cellular system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting an uplink pilot signal in a wireless communication system, the method comprising:

forming a basic unit including a plurality of pilot Resource Elements (REs) and data REs for a first antenna port and a second antenna port and having a size of 4 subcarriers (subcarrier indexes of 0 to 3)×9 Orthogonal Frequency Division Multiple Access (OFDMA) symbols (symbol indexes of 0 to 8);

setting the plurality of pilot REs for the first antenna port and the second antenna port in the basic unit; and transmitting the basic unit to a base station, wherein each of the REs is time-frequency resource defined by one symbol index and one subcarrier index, and wherein the setting of the pilot REs includes:

arranging two pilot REs out of three pilot REs for the first antenna port at a subcarrier index of 0 and symbol indexes of 0 and 8, arranging the remaining one pilot RE out of the three pilot REs for the first antenna port at a subcarrier index of 3 and any one of symbol indexes of 2 to 6;

arranging two pilot REs out of three pilot REs for the second antenna port at a subcarrier index of 3 and symbol indexes of 0 and 8; and arranging the remaining one pilot RE out of the three pilot REs for the second antenna port at a subcarrier index of 0 and any one of symbol indexes of 2 to 6.

2. The method according to claim 1, wherein the first antenna port and the second antenna port are switched with each other.

3. The method according to claim 1, wherein the transmitting of the basic unit to the base station includes boosting power of the pilot REs using power of the data REs within the same OFDMA symbol.

4. The method according to claim 1, wherein a transmit diversity scheme is applied to the basic unit.

5. The method according to claim 4, wherein the transmit diversity scheme is a Space Frequency Block Code (SFBC) scheme.

6. A mobile device configured to transmit an uplink pilot signal in a wireless communication system, the mobile device comprising:

a processor configured to form a basic unit including a plurality of pilot Resource Elements (REs) and data REs for a first antenna port and a second antenna port and having a size of 4 subcarriers (subcarrier indexes of 0 to 3)×9 Orthogonal Frequency Division Multiple Access (OFDMA) symbols (symbol indexes of 0 to 8), set the plurality of pilot REs for the first antenna port and the second antenna port in the basic unit, and transmit the basic unit to a base station, wherein each of the REs is time-frequency resource defined by one symbol index and one subcarrier index, and wherein the processor is configured to set the pilot REs by:

arranging two pilot REs out of three pilot REs for the first antenna port at a subcarrier index of 0 and symbol indexes of 0 and 8, arranging the remaining one pilot RE out of the three pilot REs for the first antenna port at a subcarrier index of 3 and any one of symbol indexes of 2 to 6, arranging two pilot REs out of three pilot REs for the second antenna port at a subcarrier index of 3 and symbol indexes of 0 and 8, and arranging the remaining one pilot RE out of the three pilot REs for the second antenna port at a subcarrier index of 0 and any one of symbol indexes of 2 to 6.

* * * * *